United States Patent [19]

Chivinsky

[11] 3,862,484

[45] Jan. 28, 1975

[54] PRODUCTION OF COMPOSITE MATERIAL
[75] Inventor: Joseph A. Chivinsky, Sarver, Pa.
[73] Assignee: Allegheny Ludlum Industries, Inc., Pittsburgh, Pa.
[22] Filed: Aug. 30, 1972
[21] Appl. No.: 284,854

Related U.S. Application Data

[63] Continuation-in-part of Ser. No. 177, Jan. 2, 1970, Pat. No. 3,693,242.

[52] U.S. Cl............... 29/472.3, 29/480, 29/487, 29/492, 29/497.5, 29/504
[51] Int. Cl............................................. B23k 31/02
[58] Field of Search ....... 29/497.5, 472.3, 504, 480, 29/486, 487, 475

[56] References Cited
UNITED STATES PATENTS

| | | | |
|---|---|---|---|
| 2,653,117 | 9/1953 | Keene | 29/480 X |
| 2,782,497 | 2/1957 | Campbell | 29/492 X |
| 2,820,286 | 1/1958 | Andrus | 29/497.5 X |
| 2,932,886 | 4/1960 | Althouse | 29/497.5 X |
| 3,034,211 | 5/1962 | Roehl et al. | 29/504 X |
| 3,133,346 | 5/1964 | Allen | 29/497.5 X |
| 3,299,503 | 1/1967 | Freyberger et al. | 29/492 X |
| 3,387,357 | 6/1968 | Serdzimir | 29/504 X |
| 3,489,618 | 1/1970 | Holtzmann | 148/12 |

FOREIGN PATENTS OR APPLICATIONS

| | | | |
|---|---|---|---|
| 544,463 | 8/1957 | Canada | 29/497.5 |

Primary Examiner—R. Spencer Annear
Assistant Examiner—Ronald J. Shore
Attorney, Agent, or Firm—Vincent G. Gioia; Robert F. Dropkin

[57] ABSTRACT

A pressure bonded composite article and a method for producing it. The article is comprised of a layer of plain carbon steel containing up to 1.5 percent of carbide former, a layer of stainless steel, and a layer of not readily oxidizable metal therebetween. The method comprises the steps of superimposing the layers, heating them at a temperature of from 1,200° to 2,400°F, and subsequently hot rolling them.

12 Claims, No Drawings

PRODUCTION OF COMPOSITE MATERIAL

This application is a continuation-in-part of copending application Ser. No. 177 filed Jan. 2, 1970, now U.S. Pat. No. 3,693,242 issued Sept. 26, 1972.

The present invention relates to a composite material and to a method for producing it.

Pressure bonded composite members are used in a variety of applications. For example, cookware is often drawn from composite material comprised of plain carbon and stainless steels. Plain carbon steel is a better heat conductor than is stainless steel. On the other hand, stainless steel has a more attractive appearance and is stain resistant to a variety of contaminants. A composite of the two metals is, however, most desirable as it combines the advantages of each metal.

In the past, deep drawn articles made from pressure bonded plain carbon-stainless steel composites were plagued with surface defects which became evident during and after drawing. These defects included wavy or wrinkled surfaces and surface ruptures, which cannot be satisfactorily removed by techniques such as buffing and grinding.

Heretofore referred to patent application Ser. No. 177 provided superior plain carbon-stainless steel composites, through which the incidence of surface defects were substantially reduced. The composites were formed by pressure bonding stainless steel to plain carbon steel containing at least one carbide former. The carbide former(s) substantially precluded carbon migration from the plain carbon steel toward and into the stainless steel, and thereby substantially precluded the formation of enriched carbide areas at the joining interface (the interface between the plain carbon steel and the stainless steel). The enriched carbide areas were hypothesized to be associated with decreased drawability on the basis that they increased strength (decreased ductility) in localized areas and/or caused melting at the joining interface. Incipient melting was and is possible since excessive amounts of carbon will lower the melting point to temperatures approaching those often attained during bonding. In addition, patent application Ser. No. 177 provided a preferred minimum carbide former-to-carbon ratio, as the yield strengths of the composites decreased and the elongations increased with increasing ratios.

The present invention improves upon that disclosed in patent appliation Ser. no. 177 by interposing at least one layer of a not readily oxidizable metal between the stainless steel and carbide former containing plain carbon steel. The not readily oxidizable metal can be adhered to the plain carbon steel, whereby it will provide for better bonding when the to be bonded surfaces are exposed to an oxidizing atmosphere, and whereby it will provide for improved bonding in an oxidixing atmosphere. Bonding can be hindered by the presence of oxides which readily form on plain carbon steel heated to bonding temperatures. However, the use of a layer of not readily oxidizable metal on the carbide former containing plain carbon steel can deter the formation of such oxides. With such a layer bonding will not be severely hindered when sealed composites fracture along their weld beads prior to or during bonding, thereby allowing excessive air to enter and form heavy oxides. Moreover, it is advantageous to bond welded assemblies which have not been evacuated of entrapped air but which have an opening or openings at their end(s), to allow gases to escape when the interior space is reduced during bonding, as trapped gases can hinder bonding in localized or even extensive areas. And in addition to all this, the layer of not readily oxidizable metal, can serve to further minimize carbon migration from the plain carbon steel into the stainless steel, and will thereby assist the carbide former in its primary objective. For this latter purpose the layer of not readily oxidizable metal does not have to be adhered to the carbide former containing plain carbon steel.

It is accordingly an object of this invention to provide a composite material and a method for producing it.

The method of the present invention comprises the steps of: providing at least one layer of plain carbon steel containing up to 1.5 percent, preferably up to 0.75 percent, of carbide former, said carbide former being present in a carbide former-to-carbon ratio of from 1.5 to 25; providing at least one layer of stainless steel; providing at least one layer of a not readily oxidizable metal; superimposing said layers of plain carbon steel, stainless steel and not readily oxidizable metal with at least one layer of not readily oxidizable metal between a layer of plain carbon steel and a layer of stainless steel; heating the superimposed layers of plain carbon steel, stainless steel and not readily oxidizable metal at a temperature of from 1,200° to 2,400°F; and hot rolling the superimposed layers of plain carbon steel, stainless steel and not readily oxidizable metal, so as to form a bond therebetween and thereby produce a composite. Although the superimposed layers can be bonded after heating at temperatures as low as 1,200°F, the layers are generally heated at a temperature of at least 1,600°F, and austenitic stainless steels are preferably heated at a temperature within the range of 1,900° to 2,300°F. Heat can be supplied through furnaces, resistance heating, lasers, or any other means known to the art. No criticality is placed upon the particular heating means. Moreover, bonding can take place in an oxidizing or non-oxidizing atmosphere. If the not readily oxidizable metal is not adhered to the plain carbon steel, it is preferable to bond in a non-oxidizing atmosphere. On the other hand, it could be advantageous to bond in an oxidizing atmosphere when the not readily oxidizable metal is adhered to, and protects the plain carbon steel. Typical non-oxidizing atmospheres are vacuums, inert gases, e.g., argon, and reducing gases; e.g., hydrogen.

For purposes of definition, the not readily oxidizable metal is a nonferrous metal having a free energy of oxide formation less negative than the free energy of oxide formation for the carbide former containing plain carbon steel, at any particular temperature within the bonding temperature range. Of course, the high bonding temperatures necessarily exclude all metals that cannot attain them without melting. Nickel, cobalt, palladium, platinum, copper, (for part of the temperature range) and chromium are illustrative of metals which satisfy the criteria. Of them, nickel is preferred. If a numerical value has to be set, the not readily oxidizable metal can be described as one having a free energy of oxide formation in Btu's/lb. mole of oxygen, less negative than $-160,000 + 36.4 (HT - 1,200)$, wherein HT is the temperature in °F at which the plain carbon steel, the stainless steel and the not readily oxidizable metal are heated. The numerical value is, however, based upon available free energy tables and subject to errors appearing in the tables.

The not readily oxidizable metal can serve to further minimize carbon migration from the carbide former containing plain carbon steel into the stainless steel, and thereby assists the carbide former in its primary objectives. Moreover, it can be adhered to the carbide former containing plain carbon steel, whereby it will provide for better bonding when the to be bonded surfaces are exposed to an oxidizing atmosphere, and whereby it will provide for improved bonding in an oxidizing atmosphere. Bonding can be hindered by the presence of oxides which readily form on certain metallic surfaces when said surfaces are heated to bonding temperatures. However, the use of a layer of not readily oxidizable metal on the surface(s) to be bonded, particularly on the carbide former containing plain carbon steel, can deter the formation of the detrimental oxides. With such a layer bonding will not be severely hindered when sealed composites fracture along their weld beads prior to or during bonding, thereby allowing excessive air to enter and form heavy oxides. Furthermore, it is advantageous to bond welded assemblies which have not been evacuated of entrapped air but which have an opening or openings at their end(s), to allow such gases to escape when the interior space is reduced during bonding, as trapped gases can hinder bonding in localized or even extensive areas.

In those instances, where the not readily oxidizable metal is adhered to the plain carbon steel and/or stainless steel, adherence can be accomplished in any manner known to the art. Typical modes of application include pressure bonding, adhesive, electroplating, and metal spraying, as discussed in U.S. Pat. Nos. 2,147,407 and 2,289,614. Although no criticality is placed upon the thickness of the layer of not readily oxidizable metal, layers ranging in thickness from 0.0001 to 0.005 inch are believed to be beneficial.

The article of the present invention is a bonded composite comprised of at least three layers; a layer of plain carbon steel containing up to 1.5 percent of carbide former, preferably up to 0.75 percent, in a carbide former-to-carbon ratio of from about 1.5 to 25, a layer of stainless steel, and a layer of a not readily oxidizable metal between the plain carbon steel and stainless steel layers. The term carbide former refers to one or more of the elements which have a strong affinity for carbon, and preferably to titanium and columbium. The amount of carbide former is limited to 1.5 percent as the benefits obtained from further increases in the level of carbide former are disproportionate with regard to the costs involved.

The ratio of carbide former-to-carbon in the plain carbon steel should be between about 1.5 and 25. This means that the weight percent of carbide forming elements should be between 1.5 and 25 times the weight percent of carbon. A minimum carbide former-to-carbon ratio of 1.5 should be present to insure sufficient carbide former to preclude carbon migration from the plain carbon steel toward and into the stainless steel and to preclude the formation of enriched carbide areas, which are associated with decreased drawability at the joining interface. Composites formed from plain carbon steel with carbide former-to-carbon ratios of 1.5 to 5.0 are often preferred as they generally have higher yield strengths than similar composites formed from plain carbon steel with carbide former-to-carbon ratios in excess of 5. Such composites are capable of achieving 0.2 percent yield strengths in excess of 70,000 pounds per square inch and are therefore particularly well suited for articles such as automobile bumpers. Other composites having carbide former-to-carbon ratios in excess of 5 are preferred at times as they are particularly well suited for use in drawn articles such as cookware. These composites are capable of achieving yield strengths less than 50,000 pounds per square inch. Yield strengths of the composites decrease and elongations increase with increasing amounts of carbide former. An upper carbide former-to-carbon ratio of 25 is imposed as the grain size of the plain carbon steel can become undesirably large at higher ratios, and since large grain sizes produce rough surfaces and reduce the finished appearance of the composite material. With regard to this, the ASTM grain size number of the plain carbon steel should be at least 3 (higher numbers represent finer grains) after bonding. A maximum carbide former-to-carbon ratio of 15 is often desirable since a range of from 5–15 has proven to provide optimum drawability.

The formation of enriched carbide areas at the joining interface of plain carbon-stainless steel composite material is not totally evident from the chemistries of the plain carbon steel and stainless steel. Carbon migration can and often does occur in a direction opposite to the carbon gradient, i.e., from a material of lower carbon content to one of higher carbon content. The direction of carbon migration is dependent upon the attainment of a condition of lower free energy and not strictly upon concentration gradients. For example, carbon will frequently diffuse from plain carbon steel of a lower carbon content to stainless steel of a higher carbon content as diffusion in this direction will often favor a condition of lower free energy since the stainless steel contains chromium which attracts the carbon from the plain carbon steel.

Also included within the scope of the present invention are heat treated articles, and drawn articles, as well as those which are cold rolled, heat treated; e.g., annealed, and suitable for further fabrication. Similarly, the method of the invention can also embrace the steps of cold rolling the bonded composite to gauge and heat treating, or cold rolling, heat treating and drawing, or just merely heat treating. For austenitic stainless steels heat treating (annealing) is generally at a temperature of at least 1,800°F, although those austenitic steels with carbon contents below about 0.03 percent and those which are stabilized with carbide formers can be heat treated at temperatures as low as 1,625°F. At lower heat treating temperatures carbon will not go into solution and instead, will form detrimental carbides which lower the steel's corrosion resistance and decrease its ductility. For ferritic stainless steels heat treating is generally at a temperature of from 1,200°– 1,600°F, although stabilized ferritic steels and those with low carbon contents can be heat treated at temperatures as high as 2,000°F. For practical purposes, a preferred lower temperature of 1,300°F is often imposed, as heat treating is a time and temperature dependent process. Maximum heat treating temperatures for ferritic steels are dependent upon the temperature at which austenite forms, as said austenite transforms to brittle martensite upon cooling.

The following steps are illustrative of a procedure encompassed by the present invention:

1. providing a layer of A.I.S.I. Type C1006 plain carbon steel having 0.04 percent carbon, and 0.4 percent titanium as an alloy addition, and electroplating it on opposite sides thereof with a 0.002 inch thick layer of nickel;

2. sandwiching said layer of plain carbon steel between two layers of A.I.S.I. Type 304 stainless steel with the nickel layers interposed between the plain carbon steel and the stainless steel layers;

3. heating the sandwiched layers at a temperature of approximately 2,000°F;

4. hot rolling the sandwiched layers so as to form a bond therebetween, and thereby produce a composite;

5. annealing the composite at a temperature of approximately 1,950°F;

6. cold rolling the composite to gauge;

7. annealing the composite at a temperature of approximately 1,950°F; and 8. drawing the composite, thereby producing a plain carbon steel-stainless steel drawn article.

The following examples illustrate how carbide formers affect the degree of carbon migration in plain carbon steel-stainless steel composites, and how they affect the yield strength and elongation of said composites.

Composites having two layers of stainless steel with a layer of plain carbon steel containing titanium sandwiched therebetween, were formed for a subsequent drawing operation. The plain carbon steel came from heats A and B whose chemistry is given below in Table I and the stainless was A.I.S.I. Type 304.

The composites were formed by: assembling the steel layers to be joined in such a manner that a layer of plain carbon steel was sandwiched between two larger layers of stainless steel which overlapped the edges of the carbon steel; welding bars of stainless steel around the edges of the carbon steel so as to form a pack which enclosed and protected the joining interfaces from exposure to the atmosphere; evacuating the pack with a valve inserted through the stainless steel bars; heating the pack to a temperature of approximately 2,250°F; and hot rolling the pack.

The packs were approximately 5 inches thick prior to hot roll bonding and approximately 0.170 inch thick thereafter. After hot rolling, the packs were annealed, cold rolled to intermediate gauge, annealed, and divided into four groups. Two of the groups $A_1$ and $A_2$, were formed from heat A plain carbon steel, whereas the other two groups, $B_1$ and $B_2$, were formed from heat B plain carbon steels. Groups $A_1$ and $A_2$ were cold rolled to 0.031 inch and groups $B_1$ and $B_2$ were cold rolled to 0.037 inch. All four groups were subsequently annealed at 1,975°F. Groups $A_1$ and $B_1$ were annealed for a period of time equal to 25 minutes per inch of thickness. Groups $A_2$ and $B_2$ were annealed for a period of time equal to 50 minutes per inch of thickness. The samples from each group were air cooled, water quenched, or air cooled from 900°F, after annealing. The 0.2 percent yield strength, elongations and grain sizes for the samples of each group are given below in Table II, as well as the degree of carbon migration detected at 250X.

TABLE I

CHEMISTRY

| Heat | C | Mn | P | S | Si | Al | Ti | Ti/C |
|------|------|------|-------|-------|------|-------|------|------|
| A | 0.06 | 0.33 | 0.006 | 0.018 | 0.06 | 0.05 | 0.14 | 2.3 |
| B | 0.04 | 0.35 | 0.005 | 0.20 | 0.04 | 0.069 | 0.45 | 11.3 |

TABLE II

| | CHEMISTRY | | | ANNEALING CONDITIONS | | | 0.2% Y.S. (p.s.i.) | % Elongation (2") | MICROSTRUCTURE | | | Carbon Migration In Cladding (250X) |
|------|------|------|------|------|------|------|------|------|------|------|------|------|
| | | | | | | | | | ASTM Grain Size | | | |
| Heat | C | Ti | Ti/C | Temp. (°F) | Time (Mins./in) | Quench | | | Cladding | Core | Cladding | |
| $A_1$ | 0.06 | 0.14 | 2.3 | — | — | — | 133,000 | 3.0 | — | — | — | Nothing Noted |
| $A_1$ | 0.06 | 0.14 | 2.3 | 1975 | 25 | A.C. | 58,000 | 35.0 | 9 | 8–7 | 9 | Light Migration |
| $A_1$ | 0.06 | 0.14 | 2.3 | 1975 | 25 | $H_2O$ | 67,000 | 23.5 | 9 | — | 9 | Light Migration |
| $A_1$ | 0.06 | 0.14 | 2.3 | 1975 | 25 | AC900°F | 59,000 | 39.0 | 9 | 8 | 9 | Very Light Migration |
| $A_2$ | 0.06 | 0.14 | 2.3 | — | — | — | 133,000 | 3.0 | — | — | — | Nothing Noted |
| $A_2$ | 0.06 | 0.14 | 2.3 | 1975 | 50 | A.C. | 55,000 | 26.0 | 8–7 | — | 8–7 | Nothing Noted |
| $A_2$ | 0.06 | 0.14 | 2.3 | 1975 | 50 | $H_2O$ | 71,000 | 17.0 | 8–7 | — | 8–7 | Nothing Noted |
| $A_2$ | 0.06 | 0.14 | 2.3 | 1975 | 50 | AC900°F | 56,000 | 29.0 | 8 | 8–6 | 8 | Nothing Noted |
| $B_1$ | 0.04 | 0.45 | 11.3 | — | — | — | 111,000 | 4.0 | — | — | — | Nothing Noted |
| $B_1$ | 0.04 | 0.45 | 11.3 | 1975 | 25 | A.C. | 31,000 | 44.5 | 9 | 5 | 9 | Nothing Noted |
| $B_1$ | 0.04 | 0.45 | 11.3 | 1975 | 25 | $H_2O$ | 53,000 | 44.0 | 10 | — | 10 | Nothing Noted |
| $B_1$ | 0.04 | 0.45 | 11.3 | 1975 | 25 | AC900°F | 33,000 | 46.0 | 10 | 5–4 | 10 | Nothing Noted |
| $B_2$ | 0.04 | 0.45 | 11.3 | — | — | — | 111,000 | 4.0 | — | — | — | Nothing Noted |
| $B_2$ | 0.04 | 0.45 | 11.3 | 1975 | 50 | A.C. | 35,000 | 45.5 | 8 | 6 | 8 | Nothing Noted |
| $B_2$ | 0.04 | 0.45 | 11.3 | 1975 | 50 | $H_2O$ | 62,000 | 29.5 | 8–7 | — | 8–7 | Nothing Noted |
| $B_2$ | 0.04 | 0.45 | 11.3 | 1975 | 50 | AC900°F | 36,000 | 42.0 | 8 | 6–5 | 8 | Nothing Noted |

Table II reveals how the degree of carbon migration decreases with increasing carbide former-to-carbon ratios, how the yield strength decreases and elongation increases with increasing carbide former-to-carbon ratios, and how the grain size of the plain carbon steel containing titanium increases with increasing carbide former-to-carbon ratios. Some light and very light carbon migration was evident at 250X in group $A_1$, which had a titanium-to-carbon ratio of 2.3, whereas no carbon migration was evident at 250X in group $B_1$, which had a titanium-to-carbon ratio of 11.3 even though groups $A_1$ and $B_1$ were similarly treated. Groups $B_1$ and $B_2$ which had titanium-to-carbon ratios of 11.3 had 0.2 percent yield strengths which were respectively lower and elongations which were respectively higher than groups $A_1$ and $A_2$ which had titanium-to-carbon ratios of 2.3, even though groups $A_1$ and $B_1$ and groups $A_2$ and $B_2$ were similarly treated. Larger grain sizes (smaller numbers indicate larger grains) were evident in the core of groups $B_1$ and $B_2$, i.e., in the titanium containing plain carbon steel layer of groups $B_1$ and $B_2$, which had titanium-to-carbon ratios of 11.3, than were evident in the core of groups $A_1$ and $A_2$ which had titanium-to-carbon ratios of 2.3 even though groups $A_1$ and $B_1$ and groups $A_2$ and $B_2$ were similarly treated.

It will be apparent to those skilled in the art that the novel principles of the invention disclosed herein in connection with specific examples thereof will suggest various other modifications and applications of the same. It is accordingly desired that in construing the breadth of the appended claims they shall not be limited to the specific examples of the invention described herein.

I claim:

1. A method for producing a formed composite, which comprises the steps of: providing at least one layer of plain carbon steel having up to 1.5 percent of carbide former, said carbide former being present in a carbide former-to-carbon ratio of from 5 to 25; providing at least one layer of stainless steel; providing at least one layer of a nonferrous third metal having a free energy of oxide formation less negative than the free energy of oxide formation for said plain carbon steel; superimposing said layers of plain carbon steel, stainless steel and third metal with at least one layer of said third metal between a layer of said plain carbon steel and a layer of said stainless steel; heating said layers of plain carbon steel, stainless steel and third metal at a temperature of from 1,200° to 2,400°F, said free energy of oxide formations being those for the particular temperature at which said layers are heated; hot rolling said layers of plain carbon steel, stainless steel and third metal so as to form a bond therebetween and thereby produce a composite; cold rolling said composite; annealing said cold rolled composite at a temperature in excess of 1,800°F, said annealed composite having a 0.2 percent yield strength of less than 50,000 pounds per square inch, and forming said composite.

2. A method according to claim 1 wherein said carbide former is present in said plain carbon steel in a carbide former-to-carbon ratio of from 5 to 15.

3. A method according to claim 1 wherein said plain carbon steel contains up to 0.75 percent of carbide former.

4. A method according to claim 1 wherein said carbide former is from the group consisting of titanium and columbium.

5. A method according to claim 1 wherein said layers are heated at a temperature in excess of 1,600°F.

6. A method according to claim 1 wherein said stainless steel is austenitic stainless steel and wherein said layers are heated at a temperature of from 1,900° to 2,300°F.

7. A method according to claim 1 wherein said third metal is adhered to said plain carbon steel prior to hot rolling.

8. A method according to claim 7 wherein said heating and said hot rolling occur in an oxidizing atmosphere.

9. A method according to claim 1 wherein said third metal has a free energy of oxide formation, in Btu's /lb. mole of oxygen, less negative than $-160,000 + 36.4 (HT-1,200)$, wherein HT is the temperature in °F at which said layers are heated.

10. A method according to claim 1 wherein said third metal is from the group consisting of nickel, cobalt, palladium, platinum, copper, and chromium.

11. A method according to claim 10 wherein said third metal is nickel.

12. A method according to claim 1 wherein said layer of third metal between said layer of plain carbon steel and said layer of stainless steel is from 0.0001 to 0.005 inch, prior to hot rolling.

* * * * *